United States Patent [19]

Jones

[11] 3,899,687

[45] Aug. 12, 1975

[54] OPTICAL LABEL SCANNING

[75] Inventor: Paul W. Jones, Franklin, Mass.

[73] Assignee: Identicon Corporation, Franklin, Mass.

[22] Filed: Aug. 9, 1973

[21] Appl. No.: 386,957

Related U.S. Application Data

[63] Continuation-in-part of Ser. No. 270,203, July 10, 1972, Pat. No. 3,801,182.

[52] U.S. Cl. .............. 250/568; 250/223 R; 250/225; 235/61.11 E

[51] Int. Cl. .............................................. G08c 9/06

[58] Field of Search ........... 250/223, 568, 569, 225, 250/570, 555, 216; 350/156; 235/61.11 E; 198/38

[56] References Cited

UNITED STATES PATENTS

| | | | |
|---|---|---|---|
| 3,056,033 | 9/1962 | Shepard | 350/156 |
| 3,351,744 | 11/1967 | Masterson | 250/569 X |
| 3,405,990 | 10/1968 | Nothnagle et al. | 350/14 X |
| 3,456,997 | 7/1969 | Stites et al. | 250/223 X |
| 3,461,303 | 8/1969 | Hanson | 250/569 X |
| 3,502,888 | 3/1970 | Stites | 350/156 X |
| 3,745,354 | 7/1973 | Vargo | 250/223 X |

*Primary Examiner*—Walter Stolwein
*Attorney, Agent, or Firm*—Charles Hieken; Jerry Cohen

[57] ABSTRACT

A scanning optical reader illuminates and reads data from labels of items on a conveyor. The optical reader is aligned within the extended vertical envelope of the conveyor. The reader comprises a polarized light source for illuminating the label and a detector which is cross-polarized with respect to the light source polarization.

7 Claims, 3 Drawing Figures

OPTICAL LABEL SCANNING

CROSS REFERENCE TO RELATED APPLICATIONS

This application is a continuation-in-part of copending U.S. Pat. application Ser. No. 270203 filed July 10, 1972, now U.S. Pat. No. 3,801,182.

BACKGROUND OF THE INVENTION

The present invention relates in general to optical scanning of labels affixed to items on a conveyor for use with automatic identification systems and more particularly concerns novel apparatus and techniques for reliably detecting information encoded on such labels even when applied on an item of low height.

A typical scanning system, such as the IDENTICON system commercially available from Identicon Corporation, Waltham, Massachusetts, comprises a photoelectric detector and scans a bar pattern on the label to produce a train of pulses or pulse intervals of time duration corresponding to the pattern width variations and the scan velocity. Such a system encounters few difficulties when special high reflectance material is used to encode data, and the items scanned are high enough to carry the encoded data for scanning from top to bottom as the side of the item passes the scanner. However, identifying labels incorporating high reflectance material are relatively expensive. Furthermore, many items are too short to accommodate the encoded data vertically. While the IDENTICON system described above works satisfactorily in many applications with labels printed with ordinary ink or ordinary paper, there is a problem when the light illuminates the label at such an angle that the light reflected from the ink portions is almost of the same intensity as the light reflected from the blank portions.

Accordingly, it is an important object of the invention to provide apparatus and techniques for overcoming one or more of the problems outlined above.

It is another object of the invention to provide improved scanning apparatus which effectively scans labels on conveyor-borne items, regardless of height.

It is another object of the invention to achieve one or more of the preceding objects while reliably reading data encoded on ordinary paper labels with ordinary ink.

It is another object of the invention to achieve one or more of the preceding objects with reliable apparatus that is relatively easy to install and tolerant of installation errors.

It is another object of the invention to achieve one or more of the preceding objects with apparatus that is compact and affords minimum interference with related equipment.

SUMMARY OF THE INVENTION

According to the invention, there is means for scanning a label in a first direction orthogonal to the direction of relative movement between the label and the means for scanning with a plane including the first direction and direction of relative movement being orthogonal to the label.

Numerous other features, objects and advantages of the invention will become apparent from the following specification when read in connection with the accompanying drawing in which:

DETAILED DESCRIPTION OF PREFERRED EMBODIMENTS

Figure 1:
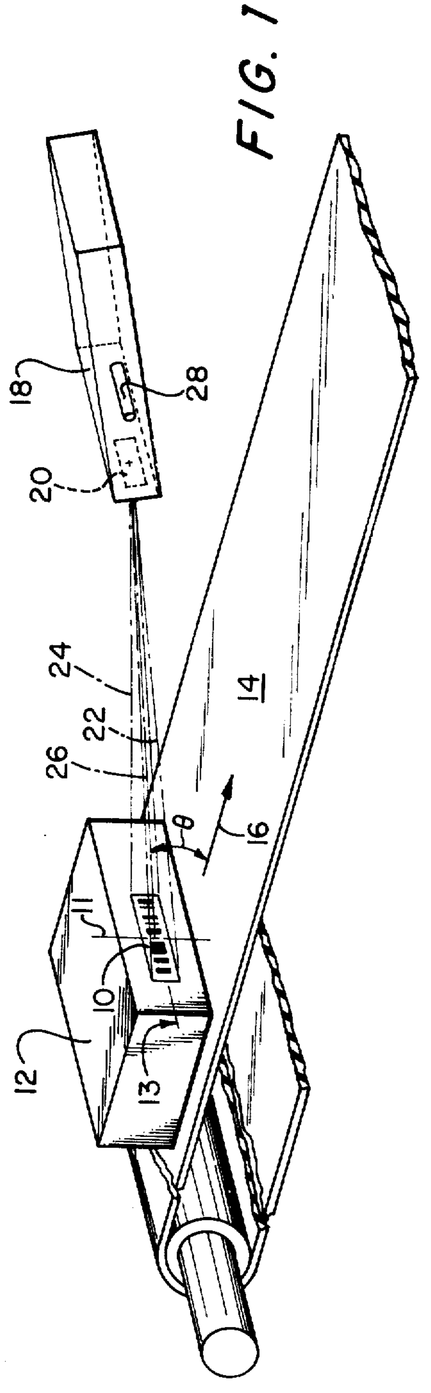
FIG. 1 is an isometric view of a conveyor-optical system arrangement according to a first embodiment of the invention.

Referring now to the drawing and more particularly FIG. 1 thereof, there is shown an isometric view of an exemplary embodiment of the invention in which an optical scanner 18 scans a label 10 as conveyor belt 14 carries package 12 toward scanner 18. Label 10, having vertical and horizontal centerlines 11 and 13, is affixed to the front surface of package 12 riding on moving conveyor belt 14. The conveyor belt is in a horizontal plane and moves in the longitudinally forward direction indicated by arrow 16. Optical scanner 18, described further in connection with FIG. 3 below, is mounted above the conveyor belt within the region between planes perpendicular to and including the sides of conveyor belt 14. Scanner 18 has a window 20 for receiving light reflected from label 10.

Scanner 18 is supported from means such as studs 28, one of which is visible in FIG. 1, by suitable fixed structure (not shown) high enough above belt 14 to allow the highest expected package to pass beneath and sufficiently far from the end of the belt from which the package approaches so that the label may enter the field of view of scanner 18. Preferably the angle $\theta$ between the viewing axis 26 of scanner 18 and the plane of conveyor belt 14 is as small as praactical consistent with maintaining a desired minimum clearance above belt 14, and the projection of axis 26 on conveyor belt 14 is preferably parallel to the length of the belt.

The package 12 may move along the conveyor belt 14 toward or away from scanner 18. So long as label 10 enters the field of view of window 20 and travels a distance between consecutive scans sufficiently small so that label 10 remains in focus to scanner 18, scanner 18 may derive a signal accurately representative of the information carried by label 10. Alternatively, there may be a second scanner facing in the opposite direction from scanner 18 to read a label on the rear of the package 12. The advantage of this arrangement is that packages may be placed with the label facing in either direction along the length of conveyor belt 14 and the label read.

Figure 2:
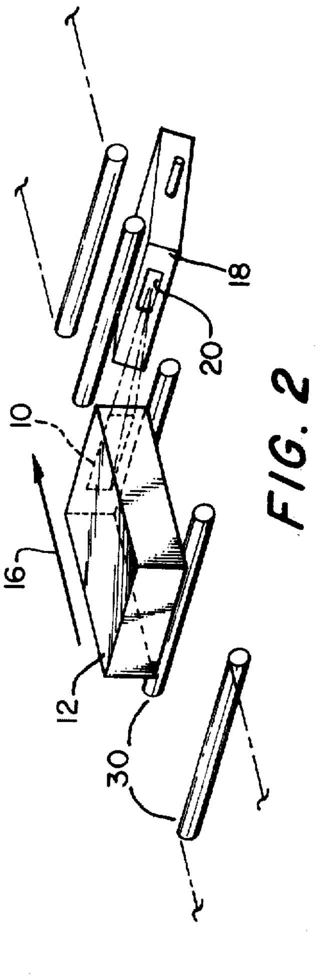
FIG. 2 is an isometric view of a conveyor-optical system arrangement according to a second embodiment of the invention.

Referring to FIG. 2, there is shown still another embodiment of the invention wherein the conveyor comprises a longitudinal array of spaced rollers 30 with scanner 18 positioned below the rollers arranged to view the label 10 on package 12 between adjacent rollers. An advantage of this arrangement is that packages of any height may be scanned so long as label 10 is positioned on the package within the solid angle scanned through window 20. Preferably, label 10 is located close to the bottom of the package. Scanner 18 might also be placed beneath conveyor belt 14 in a variation of the embodiment of FIG. 1 if conveyor belt 14 were transparent to the radiant energy being detected. Alternatively, some advantages of the invention could be attained with scanner 18 positioned to the side of the conveyor with the viewing axis 26 pointed toward the center of the conveyor so as to scan the approaching front face or departing rear face of a package as distinguished from a side face as is usually scanned with conventional systems with the viewing axis substantially perpentidular to the direction of travel of the object being scanned.

Figure 3:
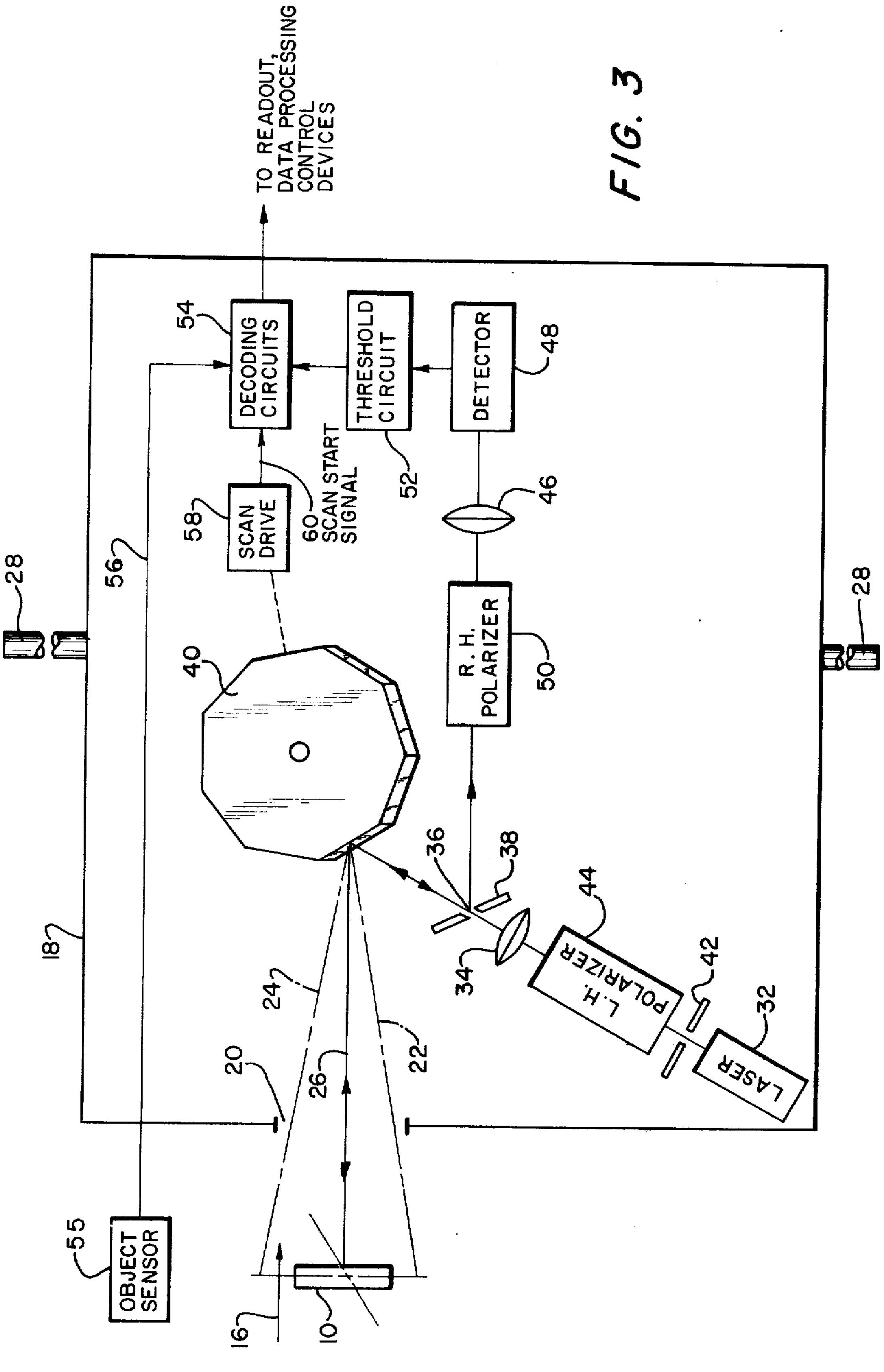
FIG. 3 is a combined block-pictorial diagram illustrating the logical arrangement of an optical system according to the invention.

Referring to FIG. 3, there is shown a combined block-pictorial diagram illustrating the logical arrangement of a suitable system for scanning label 10. Lens system 34 focuses light from a laser or other light source 32 through aperture 36 of apertured mirror 38 upon multifaceted scanning mirror 40 after passing through aperture 42 and left-hand circular polarizer 44. The rotation of scanning mirror 40 causes a beam of circularly polarized light to repeatedly scan across the length of label 10 in a direction perpendicular to the bars representative of the coded information. Scanning mirror 40 reflects light from label 10 for reflection by mirror 38 and focusing by lens system 46 upon photodetector 48 after passing through right-hand polarizer 50. Advantages of the polarization system are described in the aforesaid copending applicaton.

Photodetector 48 converts the incident light energy into electrical signals which are converted into pulses by threshold circuit 52 with durations proportional to the width of the label bars. The decoding circuits 54 convert the resulting pulse rate to useful information in response to an object sensor signal provided by an object sensor element 55 over line 56, indicating that an object is in position to be scanned, and a scan start signal provided by scan drive 58 over line 60, indicating that the start of a scan has just commenced. Details of these elements in the block diagram are part of the prior art embodied in the commercially available IDENTICON system.

The invention is characterized by a number of advantages. Ordinarily labels to be scanned have the bars mounted one above the other for vertical scanning. A disadvantage of this arrangement is that packages of height less than the length of a label may not be automatically scanned. By arranging the label with its length horizontal and scanning horizontally in accordance with the present invention, packages of virtually any height may be automatically scanned. Still another advantage is that the label being scanned is almost always at one time in a plane of very sharp focus for the scanner so that relatively few labels are not accurately scanned.

There has been described a novel scanning system characterized by numerous advantages. It is evident that those skilled in the art may now make numerous modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Label reading apparatus comprising, scanning means having a field of view for scanning along a first direction a label carrying a bar code and including detecting means responsive to radiant energy from said label for providing a signal representative of the bar code when the label is within said field of view, means for supporting an item carrying said label and relatively displacing said scanning means and said item in a second direction generally perpendicular to both said first direction and the plane of said label, whereby said label enters said field of view, and means for interpreting said signal.

2. Label reading apparatus in accordance with claim 1 wherein said means for supporting and displacing comprises means defining a conveying surface having edges along said second direction and means for supporting said scanning means in a region between planes including said edges, said planes being perpendicular to said conveying surface.

3. Label reading apparatus in accordance with claim 2 wherein said conveying surface is a conveyor belt.

4. Label reading apparatus in accordance with claim 2 wherein said conveying surface comprises rollers.

5. Label reading apparatus in accordance with claim 2 and further comprising said item carrying said label with the length and width dimensions of said label generally parallel and perpendicualr respectively to said conveying surfaces with said bars parallel to said width dimension.

6. Label reading apparatus in accordance with claim 5 wherein the separation between said label and said conveying surface is less than said width dimension.

7. Label reading apparatus in accordance with claim 5 wherein said label comprises specular and nonspecular reflecting surfaces defining said bars and said scanning means includes a source of radiant energy of circular polarization of one sense for illuminating said label and means for discriminating between the senses of circularly polarized energy reflected by said label.

* * * * *